Figure 1:
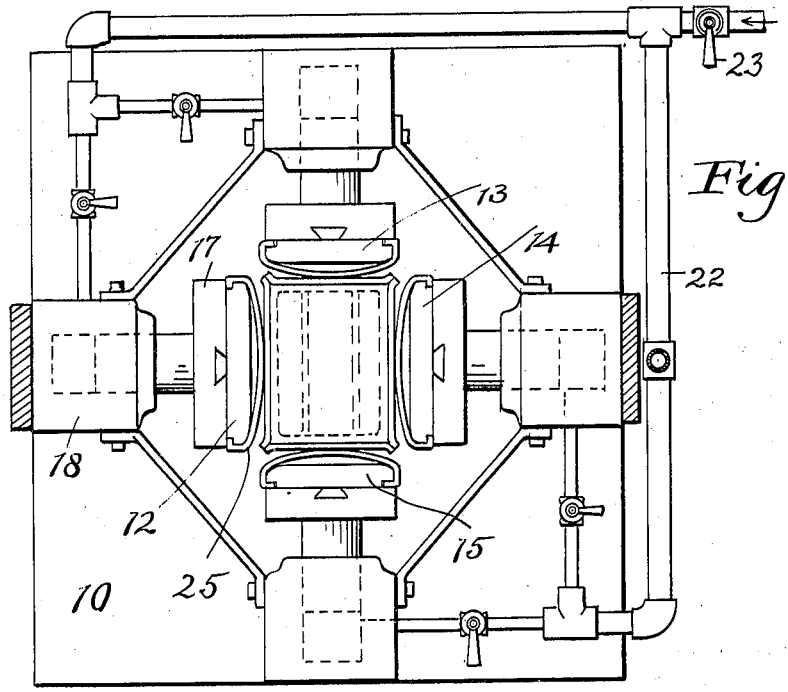

T. A. WILLARD.
APPARATUS FOR FORMING STORAGE BATTERY JARS AND THE LIKE.
APPLICATION FILED AUG. 9, 1915.

1,352,160.

Patented Sept. 7, 1920.

Inventor.
Theodore A. Willard
By Thurston & Rivos
attys.

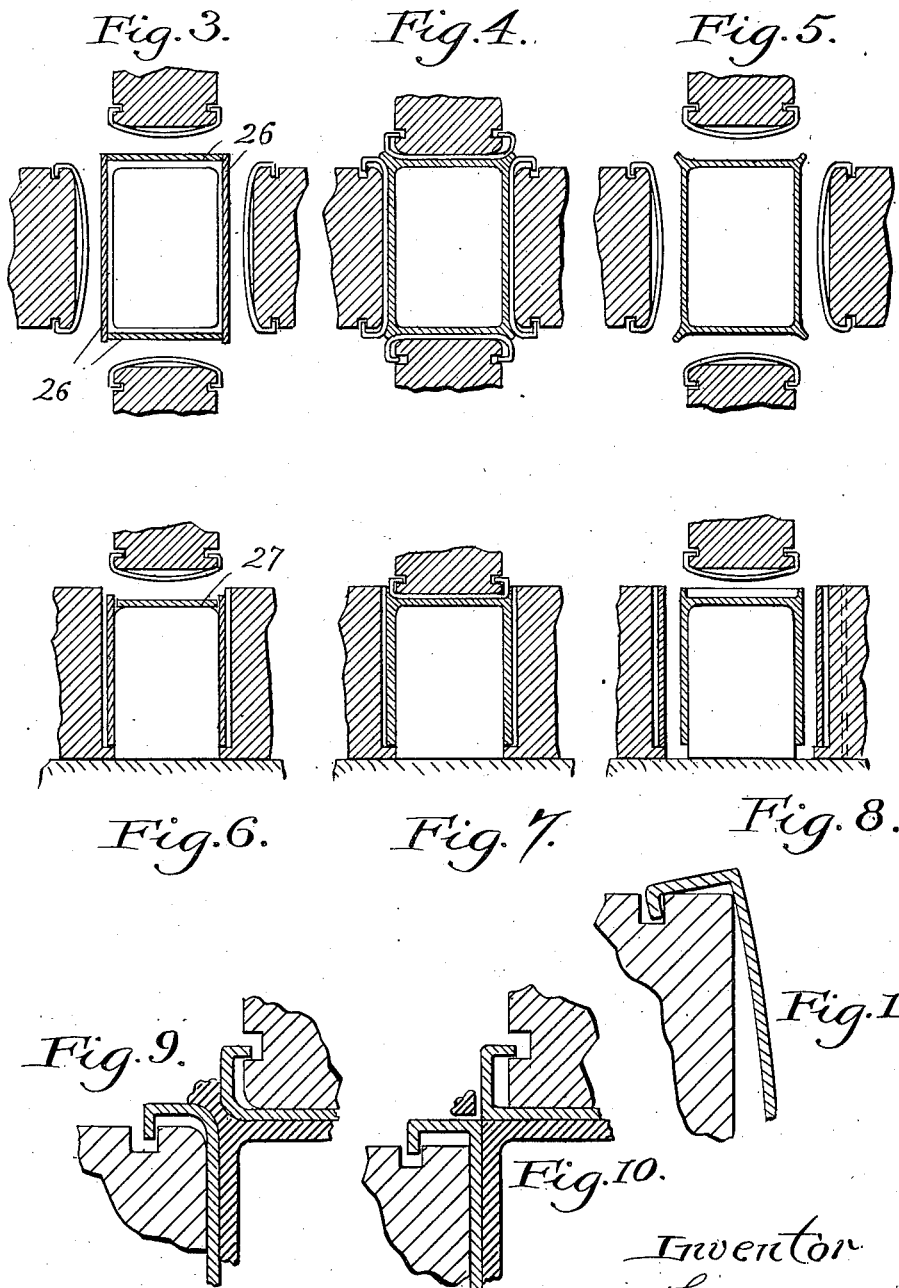

UNITED STATES PATENT OFFICE.

THEODORE A. WILLARD, OF CLEVELAND, OHIO.

APPARATUS FOR FORMING STORAGE-BATTERY JARS AND THE LIKE.

1,352,160.    Specification of Letters Patent.    Patented Sept. 7, 1920.

Application filed August 9, 1915. Serial No. 44,375.

*To all whom it may concern:*

Be it known that I, THEODORE A. WILLARD, a citizen of the United States, residing at Cleveland, in the county of Cuyahoga and State of Ohio, have invented a certain new and useful Improvement in Apparatus for Forming Storage-Battery Jars and the like, of which the following is a full, clear, and exact description.

This invention relates to apparatus for forming vessels from plastic material, and particularly for forming storage battery jars from rubber or rubber compound.

Hard rubber jars are usually made by wrapping calendered sheet rubber compound around metal forms and rolling the joints or seams together by hand, after which the mold with the compound on it is placed in a vulcanizer to cure and harden the rubber. This method, while it is the best which has been devised prior to my invention, is not satisfactory for numerous reasons. The joints and seams are a constant source of trouble as there is no way to determine whether or not the rubber is properly united at these points, and whether or not good jars are produced depends solely upon the skill of the maker or workman. Additionally, the process is not economical as skilled labor is required, a good quality of rubber is necessary, considerable time is required to produce a jar, and a large percentage of the jars leak because of defective joints and must be destroyed.

Other methods have been employed to some extent, but they have not gone into general use because they are too expensive and the results obtained are unsatisfactory.

The chief object of the present invention is to provide an apparatus by which better jars can be produced and which will very materially reduce the cost of producing the jars.

In carrying out my invention I provide an apparatus which includes a form or mandrel corresponding substantially to the internal shape of the jar and a plurality of dies which are arranged opposite the sides and one end of the mandrel and are adapted by direct pressure to form the sides and end of the jar by squeezing inwardly against the mandrel rubber compound in sheet form and at the same time to squeeze together the rubber compound of the different sheets at their edges so as to make the jar as of one unbroken or continuous homogeneous body.

The invention resides in the arrangement for accomplishing the result above stated and in numerous other important details or features of construction, among which may be mentioned means for eliminating or squeezing all air from between the mandrel and the rubber compound which is compressed therein, and the means for preventing the compound pulling away from the mandrel when the dies are retracted.

My invention may be further briefly summarized as consisting in certain novel details of construction and combinations and arrangements of parts which will be described in the specification and set forth in the appended claims.

Figure 2:
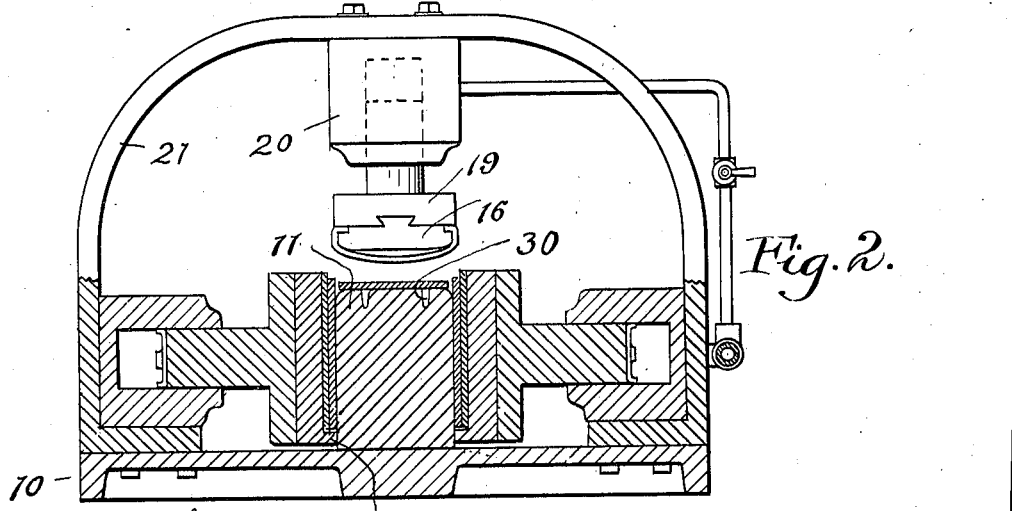
Figure 12:
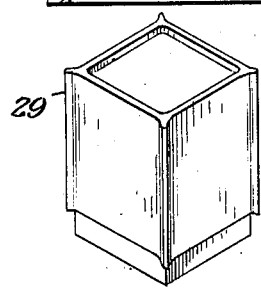

In the accompanying sheet of drawings wherein I have shown one embodiment of my invention, Figure 1 is a sectional plan view with the top part of the apparatus removed; Fig. 2 is a side view of the same partly in section, this view showing the sides of the jar already formed or compressed against the mandrel and the upper die about to form the bottom of the jar; Figs. 3, 4 and 5 are diagrammatic views, Fig. 3 showing the dies which form the sides of the jar about to be actuated, Fig. 4 is a similar view showing the same after they have been actuated to form the sides of the jar, Fig. 5 is a similar view showing the dies retracted; Figs. 6, 7 and 8 are diagrammatic views showing respectively the upper die which forms the bottom of the jar just before said die is actuated, after it is actuated, and after it has been retracted; Fig. 9 is an enlarged sectional view illustrating the manner in which the spring metal die faces act on the rubber compound to form the corners; Fig. 10 is a similar view showing a slight modification wherein the excess rubber compound formed in shaping the corners is trimmed off by the action of the dies; Fig. 11 is an enlarged sectional view illustrating a portion of one of the dies and of one of the spring metal die faces showing how the latter is shaped and held on the die so as to produce the results illustrated in Figs. 9 or 10; and Fig. 12 is a perspective view of the mandrel and jar formed thereon.

Referring now to the drawings, it will be seen that the jar forming machine or apparatus includes a flat horizontal bed 10 on which is placed a mandrel or form 11 which is rectangular in shape and corresponds to the internal shape of the finished jar which is to be produced. Rubber compound in the form of previously rolled and cut sheets is adapted to be squeezed onto the sides and top of the mandrel to form the sides and bottom of the jar by a plurality of dies 12, 13, 14 and 15 which operate on the mandrel to form the sides of the jar, and are located directly opposite the four sides of the mandrel, and a die 16 which with the coöperation of the mandrel forms the bottom of the jar and is arranged above the top of the mandrel. It may be stated at this point that my invention is susceptible of numerous modifications, particularly in the manner of actuating the dies. These dies may be moved inwardly toward the mandrel by numerous specifically different power transmitting mechanisms or media among which may be included mechanical means as well as hydraulic. Additionally, the form of the invention here shown may be further modified as it is not necessary that all the oppositely disposed dies be movable, but part may be stationary and part movable, that is to say, of the two pairs of dies operating on opposite sides of the mandrel one die of each pair might be stationary and the opposite die movable. However, I prefer to positively actuate all the dies, and I prefer also to actuate them by hydraulic rams, and this embodiment of my invention is shown in the drawing.

It will be observed that the four dies which form the sides of the jar are secured to the ends of horizontally disposed hydraulic rams or plungers 17, the outer portions of which extend in horizontally disposed hydraulic cylinders 18 mounted upon the bed 10. Likewise, the upper die 16 is carried by a hydraulic ram or plunger 19 vertically disposed and extending into a hydraulic cylinder 20 carried by any suitable framework 21 extending upwardly from the bed. Preferably these dies are all removably attached to the plungers so that they can be interchanged with dies of different sizes so as to adapt the machine for making different sizes of jars. The hydraulic cylinders will all be connected to piping 22 but which can be controlled by any number of valves 23, and which convey to the cylinders water under suitable pressure. It may be here stated that very great pressure is required to squeeze the rubber sufficiently to shape the jar and form the corners.

It is a matter of choice whether or not the dies are all operated simultaneously or whether the pairs of oppositely disposed dies which form the sides and the upper die are operated successively. I have, however, produced very good results by operating the four lower dies simultaneously and then by operating the upper die.

At their inner ends the dies are provided with spring metal die faces 25 which are normally bowed outwardly away from the end of the die, as shown in the drawings, and which extend over the edges of the die and have their edge portions fitted into slots in the sides of the dies. These spring metal dies faces perform the very important functions of expelling air from between the sheets of rubber and the mandrel; of preventing the sheets being pulled away from the mandrel when the dies are retracted; and of forming the corners closing the seams or joints between the edges of the different sheets.

In operating this apparatus the rubber compound is first rolled into sheets which may be covered on one side with tin foil if desired. This tin coating is employed if it is desired that the jars have a polished finish. The sheets are then cut into squares or rectangular pieces of approximately the size of the sides and bottom of the jar which is to be formed. Then these sheets are placed adjacent the sides and end of the jar, the four sheets forming the sides of the jar being designated 26, and the sheet forming the bottom of the jar being designated 27. Then the horizontal dies are actuated or shifted inwardly compressing the rubber and forming the sides of the jar. As the dies move inwardly each of the bowed or concave spring metal faces first engages the middle of the sheet of rubber and as it is flattened it gradually engages the sheet from the middle to the side edges, forcing out all the air between the sheet and the mandrel. This is of very great importance, for if there is any air between the rubber and mandrel, during the vulcanizing process the air expands and forces the rubber out away from the form or mandrel. Additionally the spring die faces force the surplus rubber outwardly to the edges of the sheet and form the corners of the jar, and in doing this the rubber of adjoining sheets is squeezed or pressed together and inwardly against the rounded corners of the mandrel in such way as to eliminate seams or joints and s as to form in fact a homogeneous body a all points, the corner portions having th same consistency as any other part. Afte the sides of the jar are formed, the uppe die is lowered with the requisite pressure s as to form the end of the jar, the action o the spring metal die face being the same a that before described, the upper sheet which forms the bottom of the jar being integrall united with the sheets forming the sides o the jar, leaving no evidence of a seam o joint.

After the jar is formed the dies are re tracted and in the retraction of the dies th spring metal faces perform a third impor tant function in that they prevent the die pulling the compound away from the mai drel. The spring metal faces are virtually peeled off of the compound, for as the die is retracted the metal face first leaves the compound or jar at the edges of the latter, and finally leaves the jar at the middle, the spring face assuming its concave or bowed form when the die is moved away from the mandrel. The mandrel is now coated on all sides but one with plastic rubber compound, ready to be vulcanized into a hard rubber jar in the usual manner. In the construction here shown the dies may be retracted by pumping the water from the hydraulic cylinders either by a pump or suction pipe which has not been shown.

When the horizontally movable dies are forced inwardly to form or shape the sides of the jar, all four sides are made of uniform thickness, and this is brought about by gages 28, which in this case consist of projections or flanges on the lower parts of the dies, the depth or the distance which they extend outwardly from the dies being just equal or very slightly less than the thickness that is to be given to the sides of the jar. As all four of the flanges 28 at the inward stroke of the rams engage the mandrel the thickness of the walls of the jar are very accurately gaged and the thickness is uniform at all points. It may be stated, however, that it is unnecessary that the gages be on the dies as they may be provided on the lower part of the mandrel or they may be formed by a separate device or devices placed between the mandrel and dies.

In the construction which has been thus far described by the action of the dies, or rather by the action of the spring metal die faces, there is formed at each corner of the jar a bead or ridge of surplus rubber such as shown at 29. This either before or after vulcanization, is cut off or ground off, making the jar its proper size with square or rounded corners, as desired. If found desirable, the spring metal die faces may be utilized to completely sever the rubber at the corners, as shown in Fig. 10, forming sharp square corners. In either event, *i. e.*, whether the excess rubber is severed as shown in Fig. 10 or simply moved outwardly and left on the corners of the jar, as shown in Fig. 9, there is formed a reinforced corner with a rounded fillet on the inner side of the jar. This is a feature which I believe has never been heretofore produced in any storage battery jar.

It may be mentioned at this point that storage battery jars are usually provided in their bottoms with a series of rests or bridges upon which the battery plates are supported. These bridges can be formed by providing tapered slots in the upper part of the mandrel and by either inserting pieces of rubber in these slots before the upper sheet is placed on the mandrel or by using a thick piece of compound so that a part of the latter will be forced down into the slots by the action of the die. In Fig. 2 these rests or bridges are shown at 30.

With the apparatus above described very good jars can be produced quite inexpensively, particularly as there is practically no loss, the jars being formed uniformly good, particularly at the corners, as the sheets of compound which are employed to form the jar are almost perfectly united or joined together at their edges or at the corners of the jar, leaving no evidence of a seam or joint. Additionally, the jars can be formed rapidly and skilled labor is not required as is required with the prior hand method. I have found also that jars just as effective and efficient as those produced with the hand methods could be produced with this apparatus, using a less expensive rubber compound than that which was required heretofore. I am therefor enabled with the apparatus to produce jars which are as good or better than those produced heretofore, and which cost considerably less. Further advantages which might be mentioned are that the jars are of uniform size inside and out and they may be made of any grade of compound which can be vulcanized into hard rubber. Additionally, with the process carried out by this apparatus, the rubber does not flow and the grain of the rubber is not disturbed, this together with the fact that the jars are provided with the fillet corner reinforcement and because the compound is compressed with very heavy pressure cause the jars to be exceedingly strong and durable.

Having described my invention, I claim:

1. In an apparatus for forming vessels from plastic material, a mandrel, a plurality of plungers arranged opposite the mandrel and adapted to compress plastic material in sheet form between the plungers and the mandrel, and material squeezing devices carried by said plungers and movably mounted thereon for shaping the corners of the vessel and for uniting the material of the sheets at the corners.

2. In an apparatus for forming vessels from plastic material, a mandrel, a plunger adapted to move inwardly toward the mandrel so as to compress against the mandrel plastic material in the form of a sheet, and means coöperating with the plunger for gradually and progressively pressing from the center laterally outward the air from between the sheet and the mandrel.

3. In an apparatus for forming vessels from plastic material, a mandrel, a plunger adapted to compress material in sheet form against the mandrel, and means coöperating with said plunger for gradually forcing air between the sheet and the mandrel outwardly toward the edges of the sheet.

4. In an apparatus for forming vessels from plastic material, a mandrel, a plunger arranged opposite the mandrel for compressing the material against the same and a concave spring metal member at the inner face of the plunger.

5. In an apparatus for forming vessels from plastic material, a mandrel, a movable forming member adapted to compress plastic material in sheet form against the mandrel, means for moving said member inwardly against the sheet of plastic material, and means yieldably carried by said member for preventing the plastic material being pulled away from the mandrel when said member is retracted.

6. In an apparatus for forming vessels from plastic material, a mandrel, a plurality of relatively movable plungers arranged opposite the sides of the mandrel, each plunger having at its inner face a spring metal member for forming the corners of the vessel.

7. In an apparatus for forming storage battery jars from plastic rubber compound, a rectangular mandrel, a plurality of dies arranged opposite the sides and above the top of the mandrel, means for actuating said dies so as to cause them to press rubber compound in sheet form against the sides and top of the mandrel and spring metal members carried by the inner ends of the dies.

8. In an apparatus for forming vessels from sheets of plastic material, a mandrel corresponding to the interior form of the vessel to be made and having faces against which plastic material in sheet form is adapted to be placed, dies for pressing material against the mandrel said dies first pressing a central portion of the sheet against the mandrel and progressively pressing the sheet from the center to the edges thereof.

In testimony whereof, I hereunto affix my signature.

THEODORE A. WILLARD.